United States Patent
Do et al.

(10) Patent No.: US 8,149,241 B2
(45) Date of Patent: Apr. 3, 2012

(54) ARRANGEMENTS FOR CONTROLLING ACTIVITIES OF AN AVATAR

(75) Inventors: Lydia M. Do, Raleigh, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 11/953,699

(22) Filed: Dec. 10, 2007

(65) Prior Publication Data

US 2009/0147008 A1    Jun. 11, 2009

(51) Int. Cl.
*G06T 13/00* (2011.01)

(52) U.S. Cl. .................... 345/473; 345/419; 715/706

(58) Field of Classification Search ............. 345/473, 345/419; 715/706
See application file for complete search history.

(56) References Cited

U.S. PATENT DOCUMENTS 5,880,731 A * 3/1999 Liles et al. ................ 715/758
7,065,711 B2 6/2006 Hata et al.
2004/0175680 A1 9/2004 Hlavac et al.
2007/0113181 A1 * 5/2007 Blattner et al. ............. 715/706
2008/0214253 A1 * 9/2008 Gillo et al. .................... 463/1

FOREIGN PATENT DOCUMENTS

WO    WO 03/058518 A2    7/2003
WO    WO 2007/098560 A1    9/2007

* cited by examiner

*Primary Examiner* — Xiao M. Wu
*Assistant Examiner* — Scott E Sonners
(74) *Attorney, Agent, or Firm* — Jennifer Davis; Schubert Law Group PLLC

(57) ABSTRACT

Systems are disclosed herein that allow a participant to be associated with an avatar and receive a transmission from the participant in response to a participant activated transmission. The transmission can include a participant selectable and time delayed mood and/or activity command which can be associated with a user configurable command to avatar activity conversion table. The associated avatar activity table can provide control signal to the VU system controlling the participant's avatar for extended time periods, where the activity commands allow the avatar to exhibit a mood and to conduct an activity. The preconfigured time controlled activity commands allow the user to control their avatar without being actively engaged in a session with a virtual universe client or logged on and the control configuration can be set up such that a single mood/activity control signal can initiate moods and activities that occur over an extended period of time.

18 Claims, 3 Drawing Sheets

PLEASE ASSOCIATE A TEXT COMMAND WITH A MOOD LEVEL-DURATION-FADE

| COMMAND | MODE | ACTION | LEVEL 1-5 | DURATION | FADE | PRIORITY | START TIME END TIME |
|---|---|---|---|---|---|---|---|
| :) | HAPPY | SMILE/JUMP | 3 | 2 MIN | EXP | 3 | N/A |
| :( | SAD | CRY SIT IN CORN | 5 | 1 MIN | LIN | 1 | N/A |
| SHAKE MOTION | SURPRISED | JUMP | 1 | 2 MIN | EXP | 2 | N/A |
| VCH | HAPPY | CLIMB MOUNT | 1 | 10 MIN | LIN | 2 | 2pm – 3pm WEDS |

FIG. 2

ARRANGEMENTS FOR CONTROLLING ACTIVITIES OF AN AVATAR

FIELD

The present disclosure relates generally to a virtual universe (VU) and more particularly to arrangements for controlling a mood of an avatar in a VU.

BACKGROUND

Operating in a virtual environment utilizing a computer is a pass-time that is gaining popularity. A virtual environment is an interactive simulated environment accessible by multiple users who can interact through an "online" interface using a network client. One deficiency with VUs is that relatively few methods and mechanisms allow a user to have comprehensive control of an avatar's behavior, especially when they are not logged into the VU in real time. Furthermore, relatively few methods allow a user to customize commands and avatar activities from an asynchronous or remote method.

User friendliness of computers continues to be enhanced by better user interfaces. User interfaces for computers systems have evolved significantly since the personal computer (PC) first became widely available. One particular area of advancement in user interfaces technology pertains to a graphical user interface ('GUI') that can provide multiple menus and can accept user input on each menu.

With regard to VUs, users can inhabit and interact in the virtual environment via avatars, which can be two or three-dimensional graphical representations of human or non-human form. Alternately described, an avatar can be a graphical representation that a user selects for others to see while the avatar and others are in the same virtual space. An avatar can assume various graphical representations such as that of a human character, animal character, an icon, abstract personas, and so on.

Virtual environments have many different names. For example, a virtual environment can be referred to as a "metaverse,", "3D Internet", "virtual world", and so on referred to herein collectively as a VU. Although there are many different types of virtual environments, there are several features many VUs have in common. For example, many VUs have a shared space, which is a "universe," for many avatars to reside in as they concurrently participate in an activity. The VU avatars can traverse, inhabit, and interact with other avatars via 3-D graphics and landscapes. Thus, a VU can be populated by many thousands of residents or avatars. Often, the VU resembles aspects of the real world in terms of physics or physical laws, houses, and landscapes, etc.

An agent can be a user's account, upon which the user can build an avatar, and which is tied to the inventory of assets the user owns. A region can be a virtual area of land within the VU, typically residing on a single server. Assets, avatars, the environment, and anything visual can have UUIDs (unique universal identifier) that are associated with geometric data, among other data. The geometric data can be distributed to users as textual coordinates. Textures can be distributed to users as graphics files, which are placed within the boundaries of specified textual coordinates. Effects data can be rendered by the user's client according to the user's preferences and user's device capabilities. Lastly, socialization and/or community features allow and encourage the formation of social groups such as teams, guilds, clubs, cliques, housemates, neighborhoods, etc.

Residents can be personas or representations of the users of the VU, and residents can roam all about the virtual region by walking, driving, flying, or even by teleportation or transportation, which is essentially moving through space from one point to another in the VU, more, or less instantaneously. The VU can also include things that do not presently exist in real life. An avatar can have a wide range of business and social experiences while interacting with the VU. Such, business and social experiences are becoming more common and increasingly important in online VUs.

There are many different services that provide VUs via the World Wide Web. For example, Second Life, Entropies Universe, The Sims Online, There, and Red Light Center all provide some form of VU, and these service providers have trademark rights in such names. VUs can also provide multi-player online games such as Ever Quest, Ultimo Online, Lineage, or World of Warcraft, and likewise such service providers have trademarks in such name. One popular VU mentioned above available is "Second Life" (Second Life is a trademark of Linden Research in the United States, other countries, or both). The Second Life client program provides its users (referred to as residents) with tools to view, navigate, and modify the Second Life world and participate in its virtual economy.

Second Life and other online VUs present a tremendous new outlet for both structured and unstructured virtual collaboration, gaming, exploration, advertising, and travel, as well as real-life simulations in virtual spaces. In addition many virtual environments provide immediacy, interactivity, and persistence. Immediacy allows interactions between a user's avatar and the environment to take place in real time. Persistence provides a continuous environment regardless of whether individual users are logged in.

Interactivity with the environment allows users to alter, develop, build, or submit customized content to a limited degree. As stated above, the types of objects that an avatar can possess and the types of actions an avatar can carry out are limited to the parameters of the virtual environment, which can vary for each VU service provider. The ability to customize an avatar's persona is less than perfect. For example, controlling the mood of an avatar or emotions of an avatar is not an intuitive process.

Some companies provide automated mood detectors that assume a mood of a user based on how a user interacts with their computer. Such automated mood detectors can provide emotions and animations such as crying, laughing, wagging a finger, and providing a peace sign with the avatars hands. Thus, the avatar can perform the action, do the movement when the participant, has a VU client mood acquisition system in an automated mode or a smart mode and the participant's computer can receive input from the participant's speech or text and can automatically apply a facial based on this indirect input. Such all indirect input is less than perfect.

SUMMARY OF THE INVENTION

The problems identified above are in large part addressed by the systems, arrangements, methods, and media disclosed herein that allow a participant to be associated with an avatar, receive a transmission from the participant in response to a participant activated transmission, the transmission having a participant selectable mood and/or activity command. The arrangements can associate the participant selectable mood and/or activity with any number of user-configurable activity commands for the avatar. The VU environment and/or system manages the control of the avatar in the VU in response to the user-configurable mood and/or activity commands, where the activity commands allow the avatar to exhibit a mood and to conduct an activity.

In some embodiments the participant can configure a relationship between the participant selectable mood and/or activity commands and a series of avatar activities. The data describing the relationship can be stored in a database format that can be viewed as a table. The data in the table can be configured by receiving and storing participant input that provides a menu driven interaction via, a graphical user interface. In some embodiments the system can send a mood and/or activity request query to a participant in response to an event that the avatar experiences in the VU. In other embodiments, the communication between the participant and the VU provider system can be done with a mobile device that utilizes a wireless connection. The conversion of the mood and/or activity command to the avatar activity instructions can be performed by accessing a look-up table that is stored by an avatar hosting service.

In another embodiment, a system is disclosed where a participant using a mobile communication device can directly control a mood and/or activity of an avatar. The system can include a graphical user interface module to accept participant input, where the participant input can associate a mood and/or activity control command with any number of mood and/or activity commands. The mobile communication device can also have a sensor such as an accelerometer or a global positioning sensor where a particular movement of the device can be mapped to an emotion/mood and/or activity command. The mood and/or activity commands can control actions of an avatar in a VU. The system can also include a command to activity conversion module to store the participant input and to convert the mood and/or activity control command to at least one avatar mood and/or activity command. The system can also include a VU engine to integrate the mood and/or activity command into a VU and renderer a mood and/or activity in response to a mood and/or activity control command from the participant.

In some embodiments the system can include an event detector to detect, an event associated with the avatar and to trigger a transmission to the participant. The trigger can initiate the system to transmit a prompt to the participant requesting a mood and/or activity control command. Such a communication can, at least partially be performed in a wireless mode. The prompt could take many forms. The prompt could just be a mood and/or activity status report sent to the participant so that it is possible for a user to provide another mood and/or activity command to the system when a series of mood and/or activity commends have been executed or a time period has expired. In another embodiment, the event detector can detect an event in the VU that may invoke and emotion or a mood and/or activity, such as completion of a task by the avatar.

The system can also have a voice recognition module to accept an utterance from the participant and to convert the subject matter of the utterance into a mood and/or activity control command such that a participant can control the avatar's mood and/or activity with a voice command. Thus, the spoken verbiage can be directly interpreted for subject matter or content or interpreted for a meaning and such a meaning can be utilized with a look up table and the voice command can be converted to an associated avatar command. The voice recognition and the command conversion module can be executed by an avatar hosting server. The communication between the participant and the VU system can utilize communication systems such as a short message service system, an electronic mail system or a telephone system convey the mood and/or activity control command from the participant to the VU system.

In yet another embodiment a machine-accessible medium containing instructions which, when the instructions are executed by a machine, cause said machine to perform operations, comprising controlling the mood and/or activity of an avatar are disclosed. The executed instructions can also cause the machine to associate a participant with an avatar, receive a transmission from the participant, where, the transmission has a participant selectable mood and/or activity command and associate the participant selectable mood and/or activity command with user configurable avatar activity commands. A user can configure a series of command that can exhibit a mood and/or activity of an avatar and the commands can be performed sequentially in accordance with a user configured response to a user configures command.

The activity command can be associated with a mood and/or activity and the machine can control the avatar in a VU in response to the participant activating a mood and/or activity command and the participant configured avatar activity command associated with the mood and/or activity command. In other embodiments, the instructions can cause the computer to configure a relationship between the participant selectable mood and/or activity command and the user configurable avatar activity command. The machine can also cause the computer to receive participant input via a graphical user interface and to store the received data that creates the relationship in a database format.

BRIEF DESCRIPTION OF THE DRAWINGS

Aspects of the invention will become apparent upon reading the following detailed description and upon reference to the accompanying drawings in which, like references may indicate similar elements:

FIG. 2 is a user command to activity conversion table; and

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Virtual universe (VU) providers or applications such as Second. Life have an increasing number of options available to control features or actions of avatars that inhabit the metaverse or VU. One feature that is provided by some VU service providers is to automatically provide an animated avatar, having vigor and spirit. Such vigor and spirit can be manifested by facial expressions, body language, and other gestures. Some VU service providers even monitor attributes of a participant's voice and try to give emotion to the avatar based on this indirect communication method. This indirect communication method is often inaccurate and can lead to an avatar expressing an emotion that is contrary to the expression desired by the participant. This emotion or mood and/or activity feature has also been automated to some degree by analysis of what avatars say and do when interacting in the VU. For example, emotions such as a facial expression can be automated based on an event experienced by an avatar such as falling and getting hurt. In addition, body language or gestures can be "applied" to the avatar in a semi-automatic way based on an event.

In some embodiments, arrangements are disclosed that allow a participant to directly control a mood or emotions of an avatar based on a user configured control system. In some embodiments there can be a direct control link between a participant's manual input on a mobile communication device and a mood or emotions and activities exhibited by an avatar. In some embodiments a sensor such as an accelerometer or global positioning system can detect a physical movement of a communication device and such a movement can generate a transmission from the device to the VU service provider where a movement to mood and/or activity mapping can occur. In another embodiment, the participant's device can have a program or application that decodes the motion or executes the mapping function locally at the device and sends the command to VU service provider. Thus, if a participant feels happy the participant can enter and transmit a few text characters using their mobile communication device and in "real-time" (minus processing and communication delays) the avatar can take on or exhibit a mood, emotion or related activities or gestures that are associated with the transmitted characters.

Figure 1:
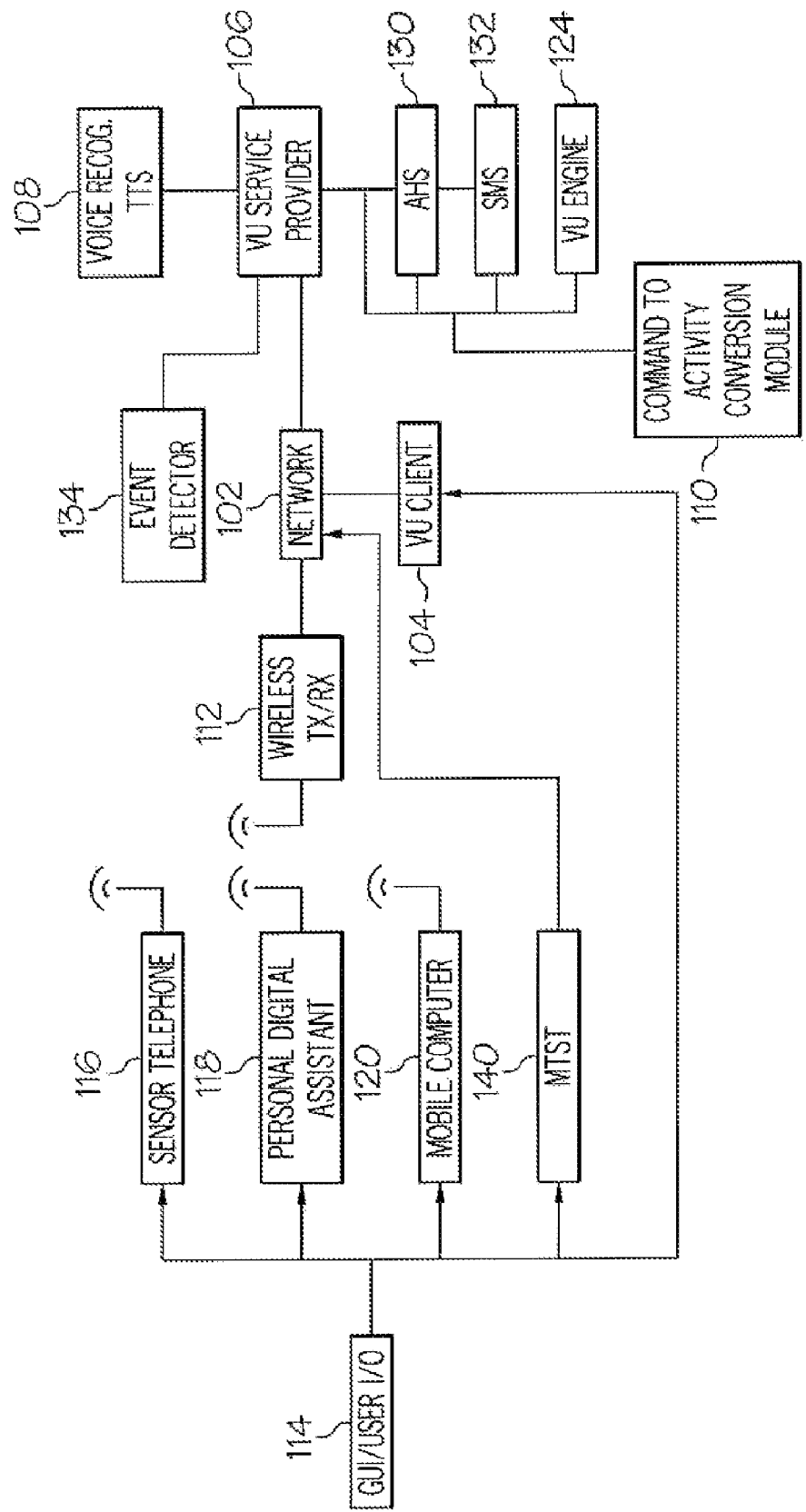
FIG. 1 is a block diagram of an avatar mood and/or activity control system.

Referring to FIG. 1 a block diagram of an avatar mood and/or activity control system 100 is disclosed. The system can include mobile or fixed base communication devices such as a mobile telephone 116, a personal digital assistant 118, or a computer 120 (communication devices 116-120). Computer 120 could be a laptop, a clipboard or a desktop personal computer to name a few. The communication devices 116-120 and the VU client 104 can have a graphical user interface (GUI) module illustrated collectively by GUI 114.

The system can also include a wireless transceiver 112 to interface the mobile communication devices (i.e. 116, 118, and 120) with a communications network 102. Computer 120 in some embodiments can be hard wired to the communications network 102. In some embodiments, the system 100 can include an event detector 134 a voice recognitions system 108, a VU engine 124, an avatar hosting system 130, a short messaging service 132, a VU client 104, and a command to activity conversion module 110.

In operation, a participant can enter a mood and/or activity command on a communication device (such as communication devices 116-120) and the mood and/or activity command can be received by the wireless transceiver 112 or by communication network 102. The mood and/or activity command can be a simple textual command and the mood and/or activity command can be received by the command to activity conversion module 110. The command to activity conversion module 110 can map the command received from the participant to one or a series of activity to be executed by the avatar in the VU. The participant can use GUI 114 to map customized commands to one or a series of activities that can, exhibit a mood and/or activity of the avatar. Thus, a participant can directly control an avatar such that the avatar can show expressions and exhibit various manifestations of emotions or mood and/or activities.

It can be appreciated that a participant can utilize a communication device such as devices 116-120 to control their avatar in a VU where the VU can be controlled by VU engine 124. The command to action conversion module 110 can be integrated with the VU engine 124. In this embodiment, the communication device 116-120 can send a command from a remote location and the command can be received by the VU engine 124. The command can be converted by the VU engine using the conversion module 110, where the command can control actions, gestures, moods and activities of the participant's avatar. It can be appreciated that actions of the avatar can be controlled by remote devices that can communicate with the VU engine 124 without requiring or utilizing the VU client application 104. Such control can be done in real time where real time infers communication and processing delays.

In some embodiments the participant can send voice based mood and/or activity control commands to the VU engine and the voice recognition text to speech module 108 can either interpret the verbal command or can convert the verbal command to a textual command such that the VU engine 124 can initiate mood based avatar activities based on voice commands that are originated from a remote communication device 116-120. Based on the verbal mood and/or activity command, the avatar can take action via the VU engine 124 without continuous real-time engagement from the user on a client machine.

It can be appreciated that the mood and/or activity command and the mood and/or activity that are attached to an avatar can be arbitrary mood and/or activity thus allowing a level abstraction from a participant's real or actual mood and/or activity. A participant who has multiple avatars can get authorized for each avatar and then the participant can quickly and efficiently transmit the same or a similar mood and/or activity command to all their avatars. The participant can identify which avatars receive which mood and/or activity commands using a graphical user interface on the communication device 116-120. The examples below illustrate ways for a participant to remotely attach a mood and/or activity to their avatar or control their avatar's mood and/or activity while not actively engaged in a real time session on the VU client machine 104.

In some embodiments a multi-touch interactive surface table 140 could be utilized to accept user inputs. For example, multiple participants could be standing or seated around the multi-touch interactive surface table 140. Each participant could be associated with an avatar in a VU and the interactive surface table could take inputs concurrently from all participants. Since the interactive surface table can interpret multi-touch input from multiple participants and each participant can set up their symbolic system or mood and/or activity look-up table via a GUI 114 on the surface 140. In one embodiment, participants may enter the mood and/or activity command to an activity look-up table using whatever inputs the participant has configured.

For example, participant one may enter rapid tapping=nervousness; participant two may enter dragging of finger across table=angry; participant three may enter by drawing a smile face with her finger=happy. The symbolic mapping or the command sent by the user may not be or need not be an actual reflection of the user's mood as an arbitrary input can control an avatar to exhibit a particular mood and/or activity. The surface 140 can manage all the inputs from the participants in real-time and send the mood and/or activity control information to the VU service provider 106. If configured to do so, the surface 140 can present each participant with a message that appears on the surface 140 in front of each participant, querying each participant if they would like to transmit a message such as a mood and/or activity message to their avatar.

Referring to FIG. 2, look-up table 200 on a graphical user interface that can be utilized by the command to activity conversion module of FIG. 1 to convert a received command to a series of activity commands is disclosed. In some embodiments, a participant can control the communication device to display a graphical user interface (GUI) to display a list of control inputs and selectable mood and/or activities. Thus, according to the user configured control system a participant can directly control a mood exhibited by an avatar in a VU. In some embodiments a participant can select a mood and/or activity from a list of modes on the GUI where the GUI prompts the participant with a series of requests such as "Please enter a command you would like to use to initiate an avatar's mood." Then "Please enter a mood you would like to associate with the command."

The system could set up a table such as the one provided in FIG. 2 where the command column 202 is shown and the mood column 204 is shown. The system using the participant configured table can, via a direct input to a mobile communication device select a mood command that correlates to their actual "real time" mood and/or activity or not their actual mood, and their avatar can then exhibit such a mood. In one embodiments an identifier can be attached to an avatar and along with the mood and/or activity command the participant can sent an identifier such that the participant can control more than one avatar with a single communication device.

It can be appreciated that the avatar can have a distinct persona as provided by/controlled by the user and such control can be carried out to present such a mood and/or activities that the in the real world a participant may not be able to accomplish. For example, the participant may attach a mood and/or activity to the avatar to conduct a business transaction where the mood is in accordance with an avatar's established persona for business transactions Such a process can provide a more accurate method of projecting a mood desired by the participant than other indirect methods such as mood controls that are assumed based on analysis of voice and/or text or other body motions that attempt to capture a mood in an indirect manner by interpreting input. In some embodiments, a participant can enter a command type in the left most command column 202. One such command can be an abbreviated command such as an emoticon command ": )", or text command such as a letter or a series of letters or a command in response to a sensor input. The command that can be sent by a communication device can be related to an action illustrated by action column 206. The action column 204 could identify a series of actions that are executed sequentially or concurrently or a combination of both. These actions in the action column 206 can be invoked when the commands in the command column 202 that is associated with the action is received by the VU system. The actions of the avatar can further be controlled by assigning an intensity level as illustrated by level column 208, duration or time period to exhibit the action, in duration column 210 and a fade in fade column 212 which can control how the mood and/or activity or emotion fades with time. In some embodiment, the participant can program a series of emotions or mood and/or activities.

The level of action from 1-5, with 1 being mild and 5 being intense, is illustrated in the level column 208. The duration that the action is to be exhibited is illustrated by column labeled duration 210 where the participant can assign any duration. The participant can also dictate how the mood and/or activity fades by controlling fade column 212. Thus, the mood and/or activity can demise linearly or exponentially or based on any other mathematical equation. It can be appreciated that a user can create a customized control commands and customize actions and variations on the actions. As stated above, in some embodiments, the participant can program a series of emotions or mood and/or activities.

Once the mood and/or activity has been selected by the participant the conversion module using the conversion table can attach or assign any number of activities to the avatar based on the preconfigured actions. Such an action can be produced in the form of coordinate data. Such an activity can be provided by an avatar hosting service. The preconfigured actions can be stored by the VU server or the avatar hosting server. As stated above, the participant can associate a key stroke, a series of keystrokes or a gesture with a mood and/or activity and the avatar can emit this mood as the avatar moves about in the VU. Thus, the avatar can exhibit a mood for an extended period of time without having the participant, provide input to the system or having to directly control their avatar in real-time.

In some embodiments a participant can control one or many avatars over an extended period of time by sending a command to the VU system that are scheduled command and/or time delayed commands. Such delayed commands can control an avatar over the extended period of time where the participant does not have to be actively engaged in a VU session. In such a situation, the participant can be sending commands without watching the situation that the avatar is experiencing. Thus, the participant need not be operating a VU client application that, displays an interactive environment with the avatar. The participant can also send a message that provides a customize control of an avatar in response avatar activity instructions that are activated in response to one or more events that occur or are encountered by the avatar. Accordingly, the system allows a user to control an avatar over an extended amount of time without being actively engaged in a real-time online VU session and thus, the system can provide a remote and asynchronous method for controlling. The selected/exhibited mood and/or activity can be any arbitrary mood and/or activity that the user assigns to the avatar or the selected/exhibited mood and/or activity can be an actual reflection of the user's actual feelings as dictated by participant input.

In some embodiments a participant can activate their avatar such that their avatar is interacting in the VU. The participant can receive a message on their portable communication device when some type of event or occurrence is encountered by their avatar in the VU. In some embodiments, an e-mail or text message can be sent by the VU server and received by the mobile communication device for viewing by the participant. In one example, the avatar might be involved on an economic transaction and the e-mail sent to the participant could be "We have completed a sales." Based on such a message the participant can be provided with a selectable list of mood and/or activities on a GUI (as shown by FIG. 2) as displayed by the communication device. Accordingly, the participant can choose from the list, a reply, and reply to the query with a mood and/or activity control signal or a mood and/or activity command.

If the participant chooses a mood and/or activity such as a happy mood and transmits the mood control signal, the VU server can invoke actions gestures, and facial expressions that outwardly show that the avatar is in a happy mood. When the message has been processed by the VU server, the mood can be exhibited by the avatar for a predetermined time period. Also, this time period can be modified or provided by the participant at the time when the mood response is selected. A series of predetermined actions could be exhibited by the avatar based on a single mood and/or activity selection. For example, in column 206 a participant could select both the : ) command and the VC happy mood command and the avatar could smile and jump up and down while climbing a mountain. When sad mood is chosen, the avatar could cry and sit in the corner and possibly cry (crying is not shown as a selection on the table provided).

In some embodiments, the participant can configure multiple successive facial expressions, body language, gestures, etc. and when such activities are conducted by the avatar and such activities can be conducted based on a single mood and/or activity command. Thus, in some embodiments a user can dynamically create or modify the command table that can be utilized by the VU server to provide avatar control or activity data that can outwardly show a mood of an avatar in a virtual setting. The user configurable look-up table 200 could be utilized by the VU server to correlate numerous gestures and/or motions into various types of moods exhibited by the avatar.

In some embodiments, the commands generated by the GUI on the communication device can be text commands sent over a short messaging service. The table 200 can provide a mapping configuration such that complex avatar instructions can be activated in responsive to a very simple or cryptic text character and thus, a one character text message can activate a series of complex actions where an avatar exhibits a noticeable mood. It can be appreciated that the user only has to send a simple command to activate one or more preconfigured actions by the avatar, where the one or more actions can provide a vivid mood. In a set up mode, the participant can set textual indicators to one or more actions showing mood and the user can specify whether the actions are performed concurrently or sequentially.

In other examples, a SMS type text message can be entered by a participant as follows: SEQ, CC, CM, DAM, PMA. This input could be, understood by the system that sequentially, (SEQ) perform, change to "Adventure" outfit (i.e. CC), go climb the highest mountain, (i.e. CM), at the top of the mountain, dance around once the avatar reaches the top, (i.e. DAM), provide a mission accomplished reply or send the user a message when this task has been completed (i.e. PM).

In some embodiments, text obtained from a participant controlled device can trigger an emotion of the avatar such that the avatar can have a virtual persona as directly controlled by the participant. In some embodiments arrangements are disclosed that can attach a participant's current "mood" or emotion to an avatar in "real-time" or without significant communication and processing delays.

Figure 3:
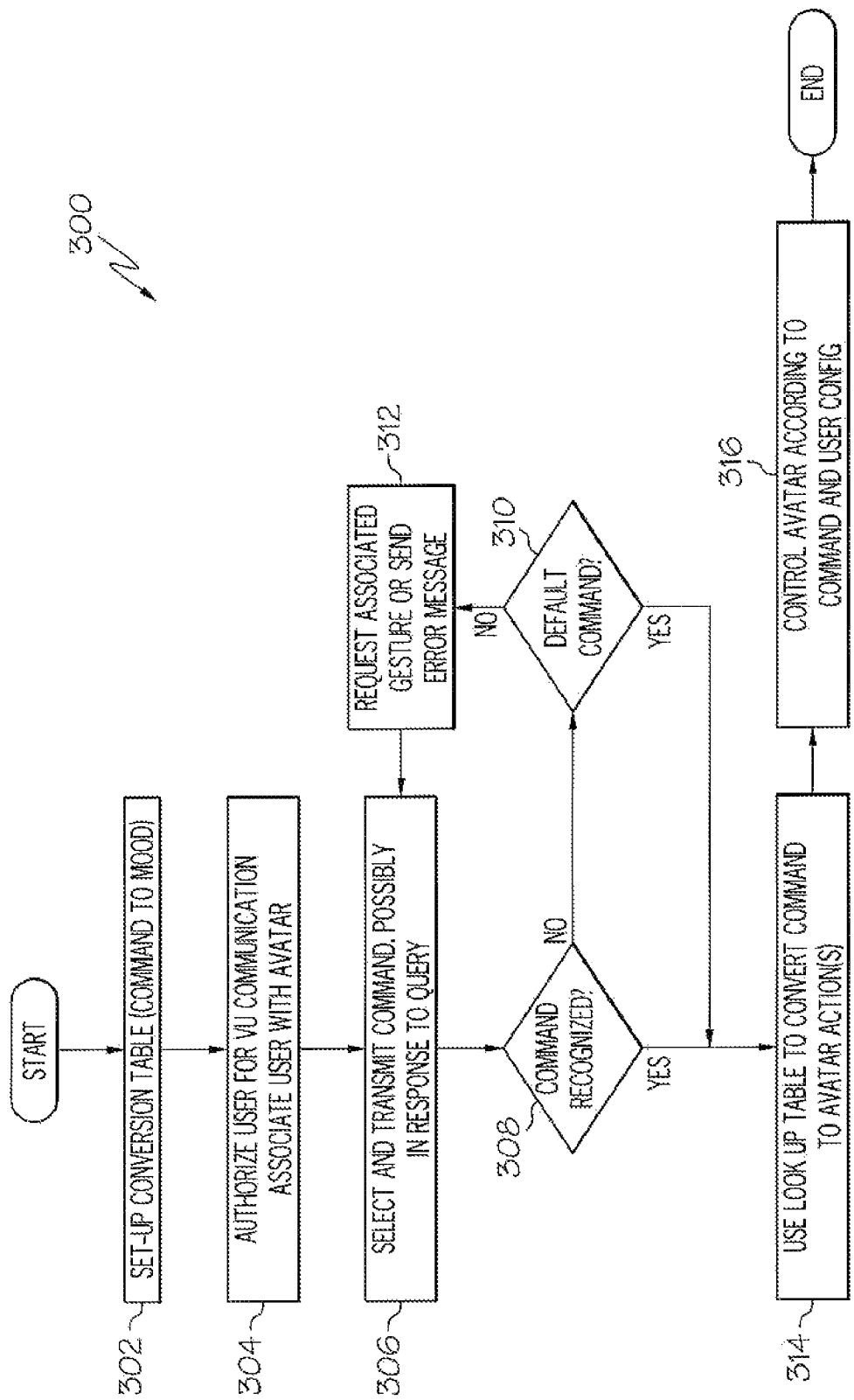
FIG. 3 is a flow diagram of a method for controlling a mood and/or activity of an avatar.

Referring to FIG. 3 a flow diagram for controlling a mood and/or activity of an avatar is illustrated. The participant in a VU can set up a command to activity conversion table as illustrated in block 302. The activity can be an activity that is ancillary to the actual control of the avatar where the control is a facial expression or a gesture. A participant can connect with a VU system and can be authorized to control one or more avatars as illustrated by block 304.

As illustrated by block 306, the user can select and transmit a mood and/or activity command to a VU system. The command can be a textual command a command generated by a sensor, or a verbal command. Decoding of the verbal command, the sensor detection or the textual input can be decoded at the mobile communication device. The mapping could be done at the communication device, at a third party server or at a VU service provider. The system can determine if the command is recognized as illustrated by decision block 308. If the command is not recognized then the system can see if the command can be recognized based on a generic or default command. If a default or generic, command is not recognized then the user can be sent an error message as illustrated by block 312 and the participant can again send a command. If the command or a default command is recognized then a command to activity conversion module can convert the command into a series of control instructions that can control an avatar such that the avatar exhibits emotion, a mood and or an activity that supports such an emotion or mood as illustrated by block 314. Accordingly either the mood and/or activities type control transmission could be transmitted by ea participant. This allows for the following transmissions a) mood only b) activities only c) mood and activities. The activities only transmission could utilize the symbolic mapping for a mood and such a mapping could be stored on a VU server, so that the mood is not decoded at the time of the user's transmission of the activities.

The conversion process can include locating a plug-in at a VU server where the plug-in can provide additional control instructions where the instructions controls the body language and facial language of the avatar. Upon receiving the communication, the VU server, with the mood and/or activity control information provided by the plug-in can control the body and facial language of the participant's avatar where the participant has direct control of the avatars mood or persona.

Generally, the mood and/or activity can be a controlled, balanced, and consistent extension of emotion over a period of time. For example, happiness can be a mood resulting from consistent extension of the pleasure or joy emotion and a mood can have different intensities and can fade over time. Similarly, a mood of depression is extension of sad emotions and can be exhibited in the VU over a long, time period according to the controls provided by the disclosed arrangements. For example, the time, intensity, duration and fading of the mood or activity can be tightly controlled. As stated above, in some embodiments a participant can control one or many avatars over an extended period of time by sending a command to the VU system that controls with the time, delays and schedule of execution and the participant, need not be operating a VU client application that displays an interactive environment when such control occurs.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Reference to particular configurations of hardware and/or software, those of skill in the art will realize that embodiments may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In some embodiments the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this, description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskettes a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to, reduce the number of times code must be retrieved from bulk storage during execution.

Input/output, or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling activities of an avatar in a virtual universe, the method comprising:

receiving by the virtual universe from a participant of the virtual universe through a virtual universe client, a first command directing an action of an avatar of the participant in the virtual universe;

executing by the virtual universe the first command, whereby the participant, through the avatar, participates in the virtual universe;

receiving by the virtual universe from the participant of the virtual universe through another means of communication between the participant of the virtual universe and the virtual universe, the means of communication not involving a virtual universe client, a second command directing a mood of the avatar of the participant in the virtual universe, wherein the receiving by the virtual universe from the participant of the virtual universe through the means of communication the second command directing the mood of the avatar of the participant in the virtual universe comprises:

transmitting to the participant by the virtual universe a request for a command from the participant directing the mood of an avatar, the transmitting in response to a transmission from the participant to the virtual universe specifying a condition for the virtual universe to transmit a request for a mood command; and receiving by the virtual universe from the participant of the virtual universe through the means of communication the second command directing the mood of the avatar of the participant in the virtual universe in response to the transmission to the participant of the request for a mood command; and executing by the virtual universe the second command, thereby modifying the mood of the avatar of the participant in the virtual universe, wherein:

the virtual universe comprises a shared virtual space accessible by multiple participants each represented by one or more avatars;

the avatars concurrently interact in the virtual space, the interaction of the avatars comprising engaging in business or social experiences with other avatars; and the virtual universe provides a continuous environment.

2. The method of claim 1, wherein specifying the condition comprises specifying a time to request the participant for a command directing the mood of the avatar.

3. The method of claim 1, wherein specifying the condition comprises specifying an event, the occurrence of the event to trigger the request to the participant for a command directing the mood of the avatar.

4. The method of claim 1, wherein:
the method further comprises receiving from the participant configuration data about the second command, the participant configuration data comprising one or more of the following:
a specification of keyboard characters constituting the second command;
a description of a mood directed by the second command;
a description of an ancillary action to express the mood of the second command;
a specification of an intensity of the mood of the second command;
a specification of a duration of the mood of the second command;
a specification of a fading algorithm for the mood of the second command;
a specification of a priority for the mood of the second command;
a specification of a start time for the modification to the mood of the second command; and
a specification of an end time for the modification to the mood of the second command, wherein the end time is subsequent to the time of receiving the command; and
executing by the virtual universe the second command comprises executing by the virtual universe the second command in accordance with the participant configuration data.

5. The method of claim 1, wherein:
the second command specifies a fixed start time for modifying the mood of the avatar and a duration for maintaining the modified mood of the avatar; and
executing by the virtual universe the second command comprises modifying the mood of the avatar at the specified fixed start time and maintaining the modified mood of the avatar for the specified duration.

6. The method of claim 1, wherein:
the second command specifies an action to be performed by the avatar; and
executing by the virtual universe the second command further comprises the avatar performing the action.

7. A computer system for controlling activities of an avatar in a virtual universe, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to receive by the virtual universe from a participant of the virtual universe through a virtual universe client, a first command directing an action of an avatar of the participant in the virtual universe;
program instructions, stored on at least one of the one or more storage devices for execution by at least one of the one or more processors via at least one of the one or more memories, to execute by the virtual universe the first command, whereby the participant, through the avatar, participates in the virtual universe;
program instructions, stored on at least one of the one or more storage devices for execution by at least one of the one or more processors via at least one of the one or more memories, to transmit to the participant by the virtual universe a request for a command from the participant to direct a mood of an avatar, the transmitting in response to a transmission from the participant to the virtual universe specifying a condition for the virtual universe to transmit a request for a mood command;
program instructions, stored on at least one of the one or more storage devices for execution by at least one of the one or more processors via at least one of the one or more memories, to receive by the virtual universe from the participant of the virtual universe through another means of communication between the participant of the virtual universe and the virtual universe, the means of communication not involving a virtual universe client, a second command directing a mood of the avatar of the participant in the virtual universe, wherein the second command is responsive to the transmission to the participant of the request for a mood command; and
program instructions, stored on at least one of the one or more storage devices for execution by at least one of the one or more processors via at least one of the one or more memories, to execute by the virtual universe the second command, thereby modifying the mood of the avatar of the participant in the virtual universe, wherein:
the virtual universe comprises a shared virtual space accessible by multiple participants, each represented by one or more avatars;
the avatars concurrently interact in the virtual space, the interaction of the avatars comprising engaging in business or social experiences with other avatars; and
the virtual universe provides a continuous environment.

8. The computer system of claim 7, wherein the program instructions to receive by the virtual universe from the participant of the virtual universe through the other means of communication between the participant of the virtual universe and the virtual universe receive a wireless transmission.

9. The computer system of claim 7, wherein the program instructions to receive by the virtual universe from the participant of the virtual universe through the means of communication between the participant of the virtual universe and the virtual universe receive at least one of the following types of transmissions:
a short message service system transmission;
an electronic mail system transmission;
a telephone system transmission; or
a transmission from a multi-touch interactive surface table.

10. The computer system of claim 7, wherein:
the second command is decoded in a communications device used by the participant or in a third party server; and
the computer system further comprises program instructions, stored on at least one of the one or more storage devices for execution by at least one of the one or more processors via at least one of the one or more memories, to receive the decoded second command from the communications device or from the third party server.

11. A computer program product for controlling activities of an avatar in a virtual universe, the computer program product comprising:
one or more computer-readable tangible storage devices;
program instructions, stored on at least one of the one or more storage devices, to receive by the virtual universe from a participant of the virtual universe through a virtual universe client, a first command directing an action of an avatar of the participant in the virtual universe;
program instructions, stored on at least one of the one or more storage devices, to execute by the virtual universe the first command, whereby the participant, through the avatar, participates in the virtual universe;
program instructions, stored on at least one of the one or more storage devices, to transmit to the participant by the virtual universe a request for a command from the participant to direct a mood of an avatar, the transmitting in response to a transmission from the participant to the virtual universe specifying a condition for the virtual universe to transmit a request for a mood command;

program instructions, stored on at least one of the one or more storage devices, to receive by the virtual universe from the participant of the virtual universe through another means of communication between the participant of the virtual universe and the virtual universe, the means of communication not involving a virtual universe client, a second command directing a mood of the avatar of the participant in the virtual universe, wherein the second command is responsive to the transmission to the participant of the request for a mood command; and program instructions, stored on at least one of the one or more storage devices, to execute by the virtual universe the second command, thereby modifying the mood of the avatar of the participant in the virtual universe, wherein:

the virtual universe comprises a shared virtual space accessible by multiple participants, each represented by one or more avatars;

the avatars concurrently interact in the virtual space, the interaction of the avatars comprising engaging in business or social experiences with other avatars; and the virtual universe provides a continuous environment.

12. The computer program product of claim 11, wherein the program instructions to specify the condition specify a time to request the participant for a command directing the mood of the avatar.

13. The computer program product of claim 11, wherein the program instructions to specify the condition specify an event, the occurrence of the event to trigger the request to the participant for a command directing the mood of the avatar.

14. The computer program product of claim 11, wherein:

the computer program product further comprises program instructions, stored on at least one of the one or more storage devices, to receive from the participant configuration data about the second command, the configuration data comprising one or more of the following:
- a specification of keyboard characters constituting the second command;
- a description of a mood directed by the second command;
- a description of an ancillary action to express the mood of the second command;
- a specification of an intensity of the mood of the second command;
- a specification of a duration of the mood of the second command;
- a specification of a fading algorithm for the mood of the second command;
- a specification of a priority for the mood of the second command;
- a specification of a fixed start time for the modification to the mood of the second command; and
- a specification of an end time for the modification to the mood of the second command, wherein the end time is subsequent to the time of receiving the command; and the program instructions to execute by the virtual universe the second command comprise executing by the virtual universe the second command in accordance with the participant configuration data.

15. The computer program product of claim 14, wherein the program instructions to receive from the participant configuration data receive a specification of keyboard characters constituting the second command and one or more of the following:
- a description of a mood directed by the second command;
- a description of an ancillary action to express the mood of the second command;
- a specification of an intensity of the mood of the second command;
- a specification of a duration of the mood of the second command;
- a specification of a fading algorithm for the mood of the second command;
- a specification of a priority for the mood of the second command;
- a specification of a fixed start time for the modification to the mood of the second command; and
- a specification of an end time for the modification to the mood of the second command, wherein the end time is subsequent to the time of receiving the command.

16. The computer program product of claim 14, wherein the program instructions to receive from the participant configuration data provide a data structure to store all of the following types of information about the second command:
- a specification of keyboard characters constituting the second command;
- a description of a mood directed by the second command;
- a description of an ancillary action to express the mood of the second command;
- a specification of an intensity of the mood of the second command;
- a specification of a duration of the mood of the second command;
- a specification of a fading algorithm for the mood of the second command;
- a specification of a priority for the mood of the second command;
- a specification of a start time for the modification to the mood of the second command; and
- a specification of an end time for the modification to the mood of the second command, wherein the end time is subsequent to the time of receiving the command.

17. The computer program product of claim 11, wherein:

the second command specifies a fixed start time for modifying the mood of the avatar and a duration for maintaining the modified mood of the avatar; and the program instructions to execute by the virtual universe the second command comprise modifying the mood of the avatar at the specified fixed start time and maintaining the modified mood of the avatar for the specified duration.

18. The computer program product of claim 11, wherein:

the second command also specifies an action to be performed by the avatar; and executing by the virtual universe the second command further comprises the avatar performing the action.

* * * * *